US008962113B2

(12) United States Patent
Yamada et al.

(10) Patent No.: US 8,962,113 B2
(45) Date of Patent: Feb. 24, 2015

(54) HEAT-SHRINKABLE LAMINATE FILM, MOLDED PRODUCT AND HEAT SHRINKABLE LABEL EMPLOYING THE FILM, AND CONTAINER

(75) Inventors: Takeyoshi Yamada, Shiga (JP); Takashi Hiruma, Shiga (JP); Yukihiro Tanaka, Shiga (JP); Jun Takagi, Shiga (JP); Hideyasu Miyazaki, Shiga (JP)

(73) Assignee: Mitsubishi Plastics, Inc., Tokyo (JP)

( * ) Notice: Subject to any disclaimer, the term of this patent is extended or adjusted under 35 U.S.C. 154(b) by 430 days.

(21) Appl. No.: 11/570,002

(22) PCT Filed: Jun. 1, 2005

(86) PCT No.: PCT/JP2005/010083
§ 371 (c)(1),
(2), (4) Date: Dec. 4, 2006

(87) PCT Pub. No.: WO2005/118288
PCT Pub. Date: Dec. 15, 2005

(65) Prior Publication Data
US 2008/0026170 A1 Jan. 31, 2008

(30) Foreign Application Priority Data

Jun. 3, 2004 (JP) .................................. 2004-165344
Sep. 29, 2004 (JP) .................................. 2004-283593
Nov. 10, 2004 (JP) .................................. 2004-326967

(51) Int. Cl.
*B32B 1/08* (2006.01)
*B32B 27/36* (2006.01)
*B29C 61/00* (2006.01)
*B29K 67/00* (2006.01)
*B29L 9/00* (2006.01)

(52) U.S. Cl.
CPC ............. *B32B 27/36* (2013.01); *B29C 61/003* (2013.01); *B29K 2067/00* (2013.01); *B29L 2009/00* (2013.01)
USPC ........................... 428/35.7; 428/483; 206/497

(58) Field of Classification Search
USPC ............. 428/34.9, 35.7, 35.9, 35.4, 483, 913; 206/497
See application file for complete search history.

(56) References Cited

U.S. PATENT DOCUMENTS

| 6,214,476 | B1 * | 4/2001 | Ikeda et al. | ............... 428/476.9 |
| 6,270,866 | B1 * | 8/2001 | Okuda et al. | ............... 428/35.1 |
| 2002/0012803 | A1 | 1/2002 | Kending | |
| 2002/0090502 | A1 * | 7/2002 | Ito et al. | ............... 428/304.4 |
| 2003/0198764 | A1 | 10/2003 | Kending | |
| 2008/0057236 | A1 | 3/2008 | Yamada et al. | |
| 2008/0090036 | A1 | 4/2008 | Hiruma et al. | |

FOREIGN PATENT DOCUMENTS

| GB | 2 040 223 | A | 8/1980 | |
| JP | 61-41543 | A | 2/1986 | |
| JP | 64-004326 | | 1/1989 | |
| JP | 5-5659 | B2 | 1/1993 | |
| JP | 7-137212 | A | 5/1995 | |
| JP | 2001-30439 | | 2/2001 | |
| JP | 2001-150600 | * | 6/2001 | ............. B32B 27/00 |
| JP | 2002-201324 | * | 7/2002 | ............. C08L 25/14 |
| JP | 2002-351332 | A | 12/2002 | |
| JP | 2003-155403 | * | 5/2003 | ............. C08L 67/02 |
| JP | 2004-170715 | A | 6/2004 | |
| WO | WO-99/29490 | A1 | 6/1999 | |
| WO | WO 01/54886 | A1 | 8/2001 | |
| WO | WO 03/016050 | A1 | 2/2003 | |

OTHER PUBLICATIONS

Machine Translation of JP 2001-150600 (Jun. 2001).*
Machine Translation of JP 2003-155403 (May 2003).*
Machine Translation of JP 2002-201324, Jul. 2002.*
International Search Report for PCT/JP2005/010083 mailed Oct. 11, 2005.
Patent Abstracts of Japan for JP2002-351332 published Dec. 6, 2002.
Patent Abstracts of Japan for JP7-137212 published May 30, 1995.
Patent Abstracts of Japan for JP64-004326 published Jan. 9, 1989.
European Office Action mailed Sep. 7, 2012 in corresponding European Patent Application 1 752 285 B1 with English Translation (42 pp.).
Comparison shrinking characteristics 30s / 10s in water bath (1 pg.) (EP Office Action of corresponding European Patent Application 1 752 285 B1 on p. 13 of the English translation).
Heat shrinkage behaviour of a film (1 pg.) (EP Office Action of corresponding European Patent Application 1 752 285 B1 on p. 13 of the English translation).
Decision rejecting the opposition (Art. 101(2) EPC) issued Apr. 30, 2014 in European Patent Application No. Patent No. 05 746 026.3-1308/ 1 752 285.
Letter from the opponent issued Oct. 1, 2013 in Patent Application No. /Patent No. 05746026.3 (with English translation).
Datasheet "Thermodur SF-E649/15", Sleeves,45 μm (Idealised shrink curve), Klöckner Pentaplast, Jul. 2, 2003, 2 pages (EP Office Action issued Oct. 1, 2013 of corresponding European Patent Application No. /Patent No. 05746026.3-1308 / 1 752 285 on p. 16 and 17).

(Continued)

*Primary Examiner* — Erik Kashnikow
(74) *Attorney, Agent, or Firm* — Oblon, Spivak, McClelland, Maier & Neustadt, L.L.P.

(57) ABSTRACT

The present invention relates to a heat-shrinkable laminate film comprising a surface layer composed mainly of polyester resin, an intermediate layer composed mainly of styrene resin, and an adhesive layer composed mainly of adhesive resin, wherein heat shrinkage in the main shrink direction is at least 10% and less than 30% when the film is dipped in water of 70° C. for 10 seconds, and at least 30% and at most 70% when dipped in water of 80° C. for 10 seconds, or its tensile modulus of elasticity in a direction perpendicular to the main shrink direction is at least 1,200 MPa. The heat-shrinkable film has excellent film elasticity, shrink finishing quality, transparency when incorporated as recycled, natural shrinkage, and suppressed delamination, making it suitable for application in shrink wrapping, shrink bundling wrapping, shrink label, and a plastic container provided with a heat shrinkable film made of such a film.

30 Claims, No Drawings

(56) References Cited

OTHER PUBLICATIONS

Declaration of Dr. Gunther Deiringer, (Erklärung von Dr. Gunther Deiringer), Sep. 24, 2013, 1 page (EP Office Action issued Oct. 1, 2013 of corresponding European Patent Application No. Patent No. 05746026.3-1308 /1 752 285 on p. 18).

Comparative tests for foil E649/15 (EP Office Action issued Oct. 1, 2013 of corresponding European Patent Application No. /Patent No. 05746026.3-1308 /1 752 285 on p. 19).

Comparison of shrinking properties KP PET types, (Vergleich Schrumpfcharakteristik KP PET Typen) [ 30 s und 10 s in Wasserbad], 1 page(EP Office Action issued Oct. 1, 2013 of corresponding European Patent Application No. /Patent No. 05746026.3-1308 /1 752 285 on p. 20).

Sheet "Einheiten-umrechnen.de", Anex to minutes of oral proceedings, Apr. 10, 2014 (EP Office Action issued Apr. 30, 2014 of corresponding European Patent Application No. /Patent No. 05746026.3-1308 /1 752 285 on p. 22).

* cited by examiner

HEAT-SHRINKABLE LAMINATE FILM, MOLDED PRODUCT AND HEAT SHRINKABLE LABEL EMPLOYING THE FILM, AND CONTAINER

INCORPORATION BY REFERENCE

The present application is a 371 of International Application No. PCT/JP2005/010083 filed on Jun. 1, 2005, which claims priority to Japanese Patent Applications Nos. 2004-165344 filed on Jun. 3, 2004, 2004-283593 filed on Sep. 29, 2004, and 2004-326967 filed Nov. 10, 2004. The entire contents of each of the above-noted documents are hereby incorporated herein by reference.

FIELD OF THE INVENTION

The present invention relates to a heat-shrinkable laminate film, a molded product and a heat-shrinkable label employing the film, and a container provided with the molded product or heat-shrinkable label. More particularly, the present invention relates to a heat-shrinkable laminate film excellent in elasticity (rigidity at room temperature), shrink finishing quality, rupture-resistance and transparency when incorporated as recycled, with little natural shrinkage and having delamination of the film suppressed, so that it is suitable for application in shrink wrapping, shrink bundling wrapping, shrink label, etc., a molded product employing the film, and a container.

BACKGROUND ART

At present, soft drinks such as juices, or alcoholic beverages such as beer, are sold in a state filled in containers such as bottles or pet bottles. In such a case, in order to differentiate the products from other products to improve visibility of the products, it is common to apply printed heat-shrinkable labels on the outside of the containers. As the base material for such heat-shrinkable labels, polyvinyl chloride, polyester or polystyrene may, for example, be usually employed.

A polyvinyl chloride (hereinafter referred to as "PVC") heat-shrinkable film has good shrink finishing quality and little natural shrinkage (i.e. the natural shrinkage being small) and thus has, heretofore, been widely used as a heat-shrinkable label. However, at the time of incineration after the use, it is likely to cause generation of a hazardous gas such as hydrogen chloride, dioxin, etc. Accordingly, from the viewpoint of environmental preservation in recent years, research and development have been carried out for a heat-shrinkable film using a material to be substituted for such PVC. On the other hand, in the application to labels for pet bottles which are expected to be more demanded, a heat-shrinkable film having little natural shrinkage is required whereby a high level of shrink finishing appearance can be obtained in a relatively short time at a relatively low temperature. The reason may, for example, be the need for a low temperature in the labeling step of a shrink film to be put on a recent pet bottle. Namely, at present, it is most common to employ a method of labeling which comprises shrinking a heat-shrinkable film by means of a vapor shrinker. However, in order to avoid deterioration of the quality due to aseptic filling or temperature rise of the content, it is desirable to carry out the shrink step at a temperature as low as possible. For such a reason, in the current shrink film industry, research and development are being carried out for a heat-shrinkable film which starts shrinkage at a temperature as low as possible in a vapor shrinker at the time of labeling and whereby after the film was passed through the vapor shrinker, an excellent shrink finishing property can be obtained.

In such an application, a polyester heat-shrinkable film is mainly used which is rigid at room temperature and has low temperature shrinkage and very little natural shrinkage. However, as compared with the PVC heat-shrinkable film, the polyester heat-shrinkable film has had a problem that at the time of the heat shrinkage, shrink marks or wrinkles are likely to form.

On the other hand, in order to overcome the problems of the above-mentioned PVC and polyester heat-shrinkable films, a polystyrene heat-shrinkable film containing a styrene-butadiene block copolymer (SBS) as the main material has been proposed and used. Such a polystyrene heat-shrinkable film has a merit in that the shrink finishing quality is good as compared with the PVC and polyester heat-shrinkable films, but, on the other hand, has had problems such that the elasticity is weak, and it is poor in natural shrinkage. Therefore, it has been attempted to develop a styrene heat-shrinkable film which is capable of solving these problems.

As a means to solve the above problems, for example, as a film for packaging material, a laminate film has been reported wherein an outer layer made of a polyester resin is laminated via an adhesive layer on an intermediate layer made of a polystyrene resin (Patent Document 1). However, such a laminate film has had a problem that during the shrinkage of the film, the adhesive layer cannot follow other layers whereby an appearance failure represented by delamination will result.

Further, a shrink label has been reported which is provided with a base film wherein front and rear layers made of a polyester resin containing 1,4-cyclohexanedimethanol as a diol component, are laminated on both sides of an intermediate layer made of a polystyrene resin (Patent Documents 2 and 3). However, such a shrink label has had problems such that the interlaminar adhesion is inadequate, and delamination is likely to result during secondary processing or during printing.

Further, as a technique having the interlaminar adhesion improved, a film has been reported wherein a block copolymer of a vinyl aromatic hydrocarbon with a conjugated diene is used for an inner layer, a copolymer polyester is used for both outer layers, and an ethylene-vinylacetate copolymer, an ethylene-unsaturated carboxylic acid copolymer, or the like, is used for an adhesive layer (Patent Document 4). However, such a film has had a problem that the compatibility between the vinyl aromatic hydrocarbon and the conjugated diene derivative of the inner layer and the ethylene-vinylacetate copolymer of the adhesive layer is poor, whereby the transparency of the entire film tends to be low when a recycled resin formed from a trimming loss of a film edge is incorporated (hereinafter referred to as "incorporated as recycled").

Patent Document 1: JP-A-61-41543
Patent Document 2: JP-A-2002-351332
Patent Document 3: JP-A-7-137212
Patent Document 4: JP-B-5-33895

BRIEF SUMMARY OF THE INVENTION

The present invention has been made in view of the above problems, and it is an object of the present invention to provide a heat-shrinkable laminate film which is excellent in the elasticity (rigidity at room temperature), low temperature shrinkability, shrink finishing quality, rupture-resistance, and transparency when incorporated as recycled, of the film and has little natural shrinkage of the film and delamination suppressed, and which is suitable for application to shrink packaging, shrink bundling packaging, shrink labels, etc.

Another object of the present invention is to provide a molded product or heat-shrinkable label employing the above film suitable for application to shrink packaging, shrink bundling packaging, shrink labels, etc., a heat-shrinkable label, and a container provided with such a molded product or a label.

The present inventors have conducted an extensive study on the respective compositions of a surface layer (S layer), an intermediate layer (M layer) and an adhesive layer (AD layer) constituting a laminate film and as a result, they have succeeded in obtaining a film which is capable of solving the problems of the conventional art and thus have accomplished the present invention.

Namely, the objects of the present invention can be accomplished by the following heat-shrinkable laminate film, a molded product or heat-shrinkable label employing such a film, and a container provided with such a molded product or heat-shrinkable label.

(1) A heat-shrinkable laminate film (hereinafter referred to also as "first embodiment") comprising a surface layer (S layer), an intermediate layer (M layer) and an adhesive layer (AD layer), wherein the respective layers are made of resins composed mainly of the following components, and its heat shrinkage is at least 30% in at least one direction, when it is dipped in warm water of 80° C. for 10 seconds:
S layer: a polyester resin
M layer: a styrene resin
AD layer: an adhesive resin.

(2) A heat-shrinkable laminate film (hereinafter referred to also as "second embodiment") comprising a surface layer (S layer), an intermediate layer (M layer) and an adhesive layer (AD layer), wherein the respective layers are made of resins composed mainly of the following components; its tensile modulus of elasticity in a direction perpendicular to the main shrink direction is at least 1,200 MPa; and its heat shrinkage is at least 30% in at least one direction, when it is dipped in warm water of 80° C. for 10 seconds:
S layer: a polyester resin
M layer: a styrene resin
AD layer: a resin comprising a copolymer of a styrene hydrocarbon with a conjugated diene, or its hydrogenated derivative, wherein the styrene content in the copolymer or its hydrogenated derivative is at least 5 mass % and at most 40 mass %.

(3) A molded product employing the heat-shrinkable laminate film as defined in the above (1) or (2) as the base material.

(4) A heat-shrinkable label employing the heat-shrinkable laminate film as defined in the above (1) or (2) as the base material.

(5) A container provided with the molded product of the above (3) or the heat-shrinkable label of the above (4).

According to the present invention, it is possible to provide a heat-shrinkable laminate film which has low temperature shrinkability and is excelling in elasticity (rigidity at room temperature), shrink finishing quality, rupture-resistance and transparency when incorporated as recycled and which has little natural shrinkage, and delamination of the film suppressed and is suitable for application to shrink packaging, shrink bundling packaging, shrink labels, etc.

Further, according to the present invention, it is possible to present a molded product and a heat-shrinkable label excellent in elasticity (rigidity at room temperature), shrink finishing quality, rupture-resistance and transparency when incorporated as recycled. Further, according to the present invention, it is possible to provide a container provided with the above molded product or the above heat-shrinkable label, which can be adhered and fixed at a desired position irrespective of the shape of the container and which exhibits a transparent clean appearance free from pockmarks or abnormality such as inadequate shrinkage.

DETAILED DESCRIPTION OF THE INVENTION

Now, the heat-shrinkable film, the molded product, the heat-shrinkable label, and the container provided with such a molded product or shrinkable label of the present invention, will be described in detail.

Even in a case where the upper and lower limit values in a numerical range slightly depart from the numerical range defined by the present invention, they are covered in the range equivalent to the present invention, so long as they provide the same effects as within the numerical range of the present invention. Further, in the present specification, "composed mainly of" means that other components may be contained within a range not to impair the functions or effects of the resins constituting the respective layers. This expression does not limit the specific content, but usually indicates a component occupying at least 50 mass %, preferably at least 70 mass %, more preferably at least 80 mass %, based on the total components constituting each layer. Further, even in a case where the upper and lower limit values of a numerical range in the present invention slightly depart from the numerical range defined by the present invention, they will be within the range equivalent to the present invention so long as they have the same effects as within the numerical range.

Heat-Shrinkable Laminate Film

The heat-shrinkable laminate film of the present invention (hereinafter referred to as "the film of the present invention" and includes both the first embodiment and the second embodiment, unless otherwise specified) comprises a surface layer (S layer) composed mainly of a polyester resin, an intermediate layer (M layer) composed mainly of a styrene resin, and an adhesive layer (AD layer) composed mainly of an adhesive to provide interlaminar adhesion between the surface layer (S layer) and the intermediate layer (M layer).

Surface Layer (S Layer)

In the film of the present invention, the polyester resin contained as the main component of the surface layer (S layer) is capable of suppressing natural shrinkage while imparting the rigidity, rupture-resistance and low temperature shrinkability to the film. A polyester resin suitable for the film of the present invention is at least one thermoplastic polyester resin comprising polybasic carboxylic acid residues and polyhydric alcohol residues.

The polybasic carboxylic acid residues to be used for the surface layer (S layer) may, for example, be residues derived from aromatic dicarboxylic acids such as terephthalic acid, isophthalic acid, 2-chloroterephthalic acid, 2,5-dichloroterephthalic acid, 2-methylterephthalic acid, 4,4-stilbene dicarboxylic acid, 4,4-biphenyl dicarboxylic acid, orthophthalic acid, 2,6-naphthalene dicarboxylic acid, 2,7-nathphalene dicarboxylic acid, bisbenzoic acid, bis(p-carboxyphenyl)methane, anthracene dicarboxylic acid, 4,4-diphenyl ether dicarboxylic acid, 4,4-diphenoxyethane dicarboxylic acid, 5-Na sulfo isophthalic acid and ethylene-bis-p-benzoic acid, and aliphatic dicarboxylic acids such as adipic acid, sebacic acid, azelaic acid, dodecanoic diacid, 1,3-cyclohexane dicarboxylic acid and 1,4-cyclohexane dicarboxylic acid, or their ester derivatives. Of such polybasic carboxylic acid residues, only one type may be contained alone, or two or more types may be contained in combination.

The polyhydric alcohol residues to be used for the surface layer (S layer) may, for example, be residues derived from e.g. diethylene glycol, ethylene glycol, 1,2-propylene glycol, 1,3-propanediol, 2,2-dimethyl-1,3-propanediol, trans-tetramethyl-1,3-cyclobuthanediol, 2,2,4,4-tetramethyl-1,3-cyclobuthanediol, 1,4-buthanediol, neopentyl glycol, 1,5-pentanediol, 1,6-hexanediol, 1,4-cyclohexanedimethanol, 1,3-cyclohexanediol, decamethylene glycol, cyclohexanediol, p-xylenediol, bisphenol A, tetrabromobisphenol A and tetrabromobisphenol A-bis(2-hydroxyethylether). Of such polyhydric alcohol residues, only one type may be contained alone, or two or more types may be contained in combination.

Among the above polyester resins, preferred is a polyester resin comprising dicarboxylic acid residues and diol residues, and it is more preferred that at least either the carboxylic acid residues or the diol residues are a mixture of at least two residues. In this specification, among such at least two residues, the most abundant residue is regarded as the main residue i.e. one having the largest mass (mol %) is regarded as the first residue, and those smaller in the amount than the first residue are regarded as the components of the second and subsequent residues (i.e. the second residue, the third residue . . . ). By making the dicarboxylic acid residues and the diol residues to be of such mixed systems, it is possible to lower the crystallizability of the polyester resin thereby obtainable, and when such a resin is used as an intermediate layer, it is possible to suppress crystallization of the intermediate layer, such being desirable.

A preferred mixture of diol residues may, for example, be one containing as the first residue the above-mentioned ethylene glycol and as the second residue, at least one member selected from the group consisting of 1,4-butanediol, neopentyl glycol, diethylene glycol, polytetramethylene glycol and 1,4-cyclohexanedimethanol, preferably 1,4-cyclohexanedimethanol.

Whereas a preferred mixture of dicarboxylic acid residues may, for example, be a mixture containing, as the first residue, terephthalic acid and, as the second residue, at least one member selected from the group consisting of isophthalic acid, 1,4-cyclohexanedicarboxylic acid, succinic acid and adipic acid, preferably a residue derived from isophthalic acid.

The total content of the dicarboxylic acid residues and diol residues as the above-mentioned second and subsequent residues, is at least 10 mol %, preferably at least 20 mol % and at most 40 mol %, preferably at most 35 mol %, based on the sum (200 mol %) of the total amount (100 mol %) of the dicarboxylic acid residues and the total amount (100 mol %) of the diol residues. When the content of the above-mentioned second and subsequent residues is at least 10 mol %, it is possible to suppress the crystallinity of the polyester thereby obtainable. On the other hand, when the content of the components as the above second and subsequent residues is at most 40 mol %, the merit of the first component can be effectively utilized.

For example, in a case where the dicarboxylic acid residues are terephthalic residues and the first residue of the diol residues is an ethylene glycol residue and the second residue is a 1,4-cyclohexanedimethanol residue, the content of the 1,4-cyclohexanedimethanol residue as the second residue is at least 10 mol %, preferably at least 15 mol %, more preferably at least 25 mol % and at most 40 mol %, preferably at most 38 mol %, more preferably at most 35 mol %, based on the sum (200 mol %) of the total amount (100 mol %) of terephthalic acid of the dicarboxylic acid component and the total amount (100 mol %) of ethylene diglycol and 1,4-cyclohexanedimethanol. By using ethylene glycol residues and 1,4-cyclohexanedimethanol residues as diol residues within such a range, it is possible to substantially eliminate the crystallizability of the polyester thereby obtainable, and the rupture-resistance can also be improved.

Further, in the above example, in a case where the dicarboxylic residues comprise a terephthalic acid residue as the first residue and an isophthalic residue as the second residue, the content of the isophthalic residue as the dicarboxylic acid residue and the 1,4-cyclohexanedimethanol residue as the diol residue, is at least 10 mol %, preferably at least 15 mol %, more preferably at least 25 mol % and at most 40 mol %, preferably at most 38 mol %, further preferably at most 35 mol %, based on the sum (200 mol %) of the total amount (100 mol %) of the terephthalic acid residue and the isophthalic acid residue, and the total amount (100 mol %) of the ethylene glycol residue and the 1,4-cyclohexanedimethanol residue.

As a specific example of the thermoplastic polyester resin comprising the polybasic carboxylic acid residues and the polyhydric alcohol residues, a polyethylene terephthalate resin, a polypropylene terephthalate resin, a polybutyrene terephthalate resin, a polyethylene isophthalate resin, a polyethylene naphthalate resin, a polybutyrene naphthalate resin, a polyethylene terephthalate-isophthalate copolymer resin, or a non-crystalline polyethylene terephthalate resin containing 1,4-cyclohexanedimethanol residues may, for example, be mentioned. Among them, a non-crystalline polyethyleneterephthalate resin wherein the polybasic carboxylic acid residues are terephthalic acid residues, and the polyhydric alcohol residues are ethylene glycol residues and 1,4-cyclohexanedimethanol, can be suitably employed.

Here, the content of 1,4-cyclohexanedimethanol residues contained in this non-crystalline polyethyleneterephthalate resin is at least 15 mol %, preferably at least 20 mol % and at most 50 mol %, preferably at most 40 mol %, in the total diol components. When the content of 1,4-cyclohexanedimethanol residues in the above non-crystalline polyethylene terephthalic resin is at least 15 mol %, it is possible to suppress deterioration of the printability by crystallization or brittleness with time, and when it is at most 50 mol %, it is possible to maintain a proper viscosity for melt extrusion and to obtain a good film-forming property. Further, 1,4-cyclohexanedimethanol has two types of isomers i.e. cis-form and trans-form, and either isomer is useful.

The weight (mass) average molecular weight of the polyester resin to be used for the surface layer (S layer) is at least 30,000, preferably at least 35,000, more preferably at least 40,000 and at most 80,000, preferably at most 75,000, more preferably at most 70,000. When the weight (mass) average molecular weight is at least 30,000, a proper resin cohesive force can be obtained, whereby it is possible to avoid deficiency in the strength or elongation of the film or to suppress brittleness. On the other hand, when the weight (mass) average molecular weight is at most 80,000, the melt viscosity can be lowered, such being desirable from the viewpoint of the production and improvement in the productivity.

The intrinsic viscosity (IV) of the polyester resin to be used for the surface layer (S layer) is at least 0.5 dl/g, preferably at least 0.6 dl/g, more preferably at least 0.7 dl/g and at most 1.5 dl/g, preferably at most 1.2 dl/g, more preferably at most 1.0 dl/g. When the intrinsic viscosity (IV) is at least 0.5 dl/g, it is possible to control the decrease in the film strength properties. On the other hand, when the intrinsic viscosity (IV) is at most 1.5 dl/g, it is possible to prevent breakage, etc. due to an increase of the stretching tensile force.

The refractive index ($n_2$) of the polyester resin to be used for the surface layer (S layer) is within a range of from 1.560 to 1.580, preferably about 1.570. In such a case, the refractive index ($n_1$) of the styrene hydrocarbon-conjugated diene hydrocarbon block copolymer contained in the after-mentioned intermediate layer is at least 1.540, preferably at least 1.550, more preferably at least 1.555, and at most 1.600, preferably at most 1.590, more preferably at most 1.585.

Commercial products of the above polyester resin may, for example, be "PETG copolyester6763" (manufactured by Eastman Chemical Company) or "SKYGREEN PETG S2008" (manufactured by SK Chemicals).

Further, in the surface layer (S layer) of the film of the present invention, it is also useful to mix a crystalline polyester resin represented by polybutylene terephthalate or polybutylene terephthalate copolymerized with a polyether. In a case where a heat shrinkable film is used as mentioned above, printing and bag-forming step employing a solvent are usually involved, whereby it will be necessary to lower crystallizability of the constituting material itself in order to improve the printing properties and solvent-sealing properties. However, if the resin of the constituting material is made to be completely non-crystalline, it tends to be difficult to fully satisfy the properties required for a heat-shrinkable film. Accordingly, depending upon the particular application, there may be a case where a proper crystallinity is imparted.

Further, a heat-shrinkable film composed solely of a non-crystalline polyester resin has a sharp rising of the shrink curve depending upon its viscoelastic property and a very high contraction stress. On the other hand, when a crystalline polyester resin is mixed to impart a proper crystallinity, the heat-shrinkage at a high temperature decreases, and consequently, the heat shrink curve will be mild, whereby improvement in the shrink finishing quality of the film can be expected.

Further, by imparting crystallinity by mixing a crystalline polyester resin, it is possible to improve the thickness precision of the film after stretching. In the initial stage of the stretch processing, when the heated film is partially observed, a non-uniform temperature distribution may be observed. In such a case, stretching will be started at a high temperature portion. In a case where the resin to be used is a non-crystalline polyester resin, the stretched thin portion will further be stretched, resulting in non-uniform stretching over the entire film. Whereas, in a case where crystallinity is imparted by mixing a crystalline polyester resin, the initially stretched portion becomes thin, but the stretch stress will be large by alignment crystallization, whereby the non-stretched portion tends to be readily stretched. As a result, uniform stretching can be carried out over the entire film, whereby the thickness precision can be improved.

In a case where the above-mentioned crystalline polyester resin is to be mixed to the surface layer (S layer) the crystalline polyester resin may be incorporated in an amount of at least one part by mass, preferably at least 3 parts by mass, more preferably at least 5 parts by mass, and at most 30 parts by mass, preferably at most 25 parts by mass, more preferably at most 20 parts by mass, per 100 parts by mass of the polyester resin constituting the surface layer (S layer). When the content of the crystalline polyester resin is at least 5 parts by mass, proper crystallinity can be imparted to the film, and the shrinkage of the film tends to be mild, whereby good shrink finishing quality can be expected. Further, when the content of the crystalline polyester resin is at most 30 parts by mass, the elasticity and shrinkage properties of the film can be maintained, the printing properties and the solvent sealing properties will not be impaired, and the film will be useful as a heat-shrinkable film.

Further, the surface layer (S layer) may suitably contain, in addition to the above described polyester resin, a thermoplastic polyester elastomer constituted by an aromatic polyester with a high melting point and high crystallinity as hard segments, and a non-crystalline polyester or non-crystalline polyether as soft segments (commercial products may, for example, be PRIMALLOY (manufactured by Mitsubishi Chemical Corporation) or PELPRENE (manufactured by TOYOBO CO., LTD.)). Further, a polyolefin resin, a polystyrene resin, a polycarbonate resin and an acrylic resin may, for example, be incorporated alone or in combination of two or more of them within a range not to impair the effects of the present invention.

Intermediate Layer (M Layer)

In the present invention, a styrene resin is used as the main component of the resin constituting the intermediate layer (M layer) of the film. As the styrene resin, a copolymer of a styrene hydrocarbon with a conjugated diene hydrocarbon, a mixture containing at least two types of such copolymers different in the styrene content, a copolymer of such a copolymer with a monomer copolymerizable with a styrene hydrocarbon or a conjugated diene hydrocarbon, a homopolymer of a styrene hydrocarbon or a mixture of at least two types thereof, may be employed. Among them, it is preferred to employ a copolymer of a styrene hydrocarbon with a conjugated diene hydrocarbon.

The styrene hydrocarbon may, for example, be a polystyrene; a polyalkylstyrene such as poly(p-, m- or o-methylstyrene), poly(2,4-, 2,5-, 3,4- or 3,5-dimethylstyrene) or poly(p-t-butylstyrene); a polyhalogenated styrene such as poly(o-, m- or p-chlorostyrene), poly(o-, m- or p-bromostyrene), poly(o-, m- or p-fluorostyrene) or poly(o-methyl-p-fluorostyrene); a polyhalogenated alkylstyrene such as poly(o-, m- or p-chloromethylstyrene); a polyalkoxystyrene such as poly (p-, m- or o-methoxystyrene) or poly(o-, m- or p-ethoxystyrene); a polycarboxyalkylstyrene such as poly(o-, m- or p-carboxymethylstyrene); a polyalkyl ether styrene such as poly(p-vinyl benzyl propyl ether); a polyalkylsilylstyrene such as poly(p-trimethylsilylstyrene); or a polyvinyl benzyl dimethoxy phosphide. The styrene hydrocarbon may be constituted by one or more of them.

The conjugated diene hydrocarbon may, for example, be butadiene, isoprene, 2-methyl-1,3-butadiene, 2,3-dimethyl-1,3-butadiene, 1,3-pentadiene or 1,3-hexadiene. The conjugated diene hydrocarbon may be constituted by one or more of them.

The monomer copolymerizable with a styrene hydrocarbon may, for example, be an aliphatic unsaturated carboxylate such as methyl (meth)acrylate, butyl (meth)acrylate, 2-ethylhexyl (meth)acrylate, lauryl (meth)acrylate or stearyl (meth) acrylate. Among them, a copolymer of styrene with butyl (meth)acrylate is particularly preferred, and especially preferred is one wherein the styrene content in the copolymer is within a range of from 70 mass % to 90 mass %, Tg (the peak temperature of loss elastic modulus E") is from 50° C. to 90° C., and the measured value of melt flow rate (MFR) (measuring conditions: temperature of 200° C., load or 49 N) is within a range of from 2 g/10 min to 15 g/10 min. Here, the (meth) acrylate represents and acrylate and/or a methacrylate.

The monomer copolymerizable with a conjugated diene hydrocarbon may, for example, be acrylonitrile.

One of the copolymers of a styrene hydrocarbon with a conjugated diene hydrocarbon to be preferably used for the intermediate layer (M layer) is a styrene-butadiene copolymer (SBS) wherein the styrene hydrocarbon is styrene and the conjugated diene hydrocarbon is butadiene. The styrene content of SBS is at least 60 mass %, preferably at least 65 mass %, more preferably at least 70 mass %. Further, the upper limit of the styrene content is 95 mass %, preferably 90 mass %, more preferably 85 mass %. When the styrene content is at least 60 mass %, the impact resistance effects can be provided, and when the upper limit is 95 mass %, the elasticity of the film at a temperature around room temperature can be maintained, and good elasticity can be obtained. When a styrene-butadiene copolymer is used as the styrene resin, its polymer form is not particularly limited and may be in any one of a block copolymer, a random copolymer and a copolymer having a tapered block structure, but a block copolymer is preferred.

As another example of the copolymer of a styrene hydrocarbon with a conjugated diene hydrocarbon to be preferably used in the present invention, a styrene-isoprene-butadiene block copolymer (SIBS) may be mentioned. In SIBS, the mass % ratio of styrene-isoprene-butadiene is preferably (60 to 90)/(5 to 40)/(5 to 30), more preferably (60 to 85)/(10 to 30)/(5 to 25), further preferably (60 to 80)/(10 to 25)/(5 to 20). Further, the measured value of MFR of SIBS (measuring conditions: temperature of 200° C., load of 49 N) is at least 2 g/10 min, preferably at least 3 g/10 min, and at most 15 g/10 min, preferably at most 10 g/10 min, more preferably at most 8 g/10 min. If the butadiene content is large, and the isoprene content is small, the butadiene heated in the extruder or the like tends to undergo a crosslinking reaction, whereby a gel substance may sometimes increase. On the other hand, if the butadiene content is small, and the isoprene content is large, the material costs will increase, and the production costs will sometimes be large.

Further, the above-mentioned styrene resin may be used alone, or two or more styrene resins different in the styrene content may be used as mixed. Further, the above styrene resin may be a copolymer of a styrene hydrocarbon with a conjugated diene hydrocarbon and a copolymer of such a copolymer with a monomer copolymerizable with a styrene hydrocarbon or a conjugated hydrocarbon or a mixture of the copolymer of a styrene hydrocarbon with a conjugated diene hydrocarbon and a homopolymer of a styrene hydrocarbon.

For example, in a case where the above styrene resin is a mixture of SBS and SIBS, the mass % ratio of SBS/SIBS is preferably at a level of (90 to 10)/(10 to 90), more preferably (80 to 20)/(20 to 80), further preferably (70 to 30)/(30 to 70).

The weight (mass) average molecular weight (Mw) of the styrene resin to be used for the intermediate layer (M layer) is at least 100,000, preferably at least 150,000, and at most 500,000, preferably at most 400,000, and further preferably at most 300,000. When the weight (mass) average molecular weight (Mw) of the styrene resin is at least 100,000, there will be no such drawback as deterioration of the film. Further, when the weight (mass) average molecular weight (Mw) of the styrene resin is at most 500,000, there will be no necessity to adjust the flowability, and there will be no such drawback as deterioration in the extrusion property.

The measured value of melt flow rate (MFR) of the styrene resin to be used for the intermediate layer (M layer) (measuring conditions: temperature of 200° C., load of 49 N) is at least 2 g/10 min, preferably at least 3 g/10 min, and at most 15 g/10 min, preferably at most 10 g/10 min, more preferably at most 8 g/10 min. When MFR is at least 2, a suitable flow viscosity will be obtained at the time of the extrusion, whereby the productivity can be maintained or improved. Further, when MFR is at most 15, a proper cohesive force of the resin can be obtained, whereby an excellent film strength and elongation can be attained, and the film may be made hardly susceptible to brittleness.

The content of the styrene resin contained in the intermediate layer (M layer) is at least 50 mass %, preferably at least 65 mass %, further preferably at least 80 mass %, based on the total amount of the resins constituting the intermediate layer (M layer). However, in a case where GPPS is incorporated, Tg (peak temperature of loss elastic modulus E") of GPPS is very high at a level of 100° C., and the content of GPPS to be mixed is preferably made to be at most 40 mass %, preferably at most 30 mass %, more preferably at most 20 mass %, based on the total amount of the resins constituting the intermediate layer (M layer).

If as mentioned above, the styrene resin contained in the intermediate layer (M layer) is at least 50 mass % of the total amount of the resins constituting the intermediate layer (M layer), other resins may be mixed. As such other resins, a polyester resin, a polyolefin resin, an acrylic resin and a polycarbonate resin, may, for example, be mentioned, and it is particularly preferred to employ a polyester resin among them.

In a case where the styrene resin contained in the intermediate layer (M layer) is a block copolymer of a styrene hydrocarbon with a conjugated diene hydrocarbon, the refractive index ($n_1$) measured in accordance with JIS K7142, for the above block copolymer is preferably within a range of ±0.2, more preferably ±0.015, of the refractive index ($n_2$) of the polyester resin contained in the surface layer (S layer). By thus adjusting the difference between the refractive index of the intermediate layer (M layer) and the refractive index of the surface layer (S layer) to be within the specific range, it is possible to obtain a transparent good film even in a case where cut off fragments formed in the film-production step are mixed to the after-mentioned adhesive layer (AD layer), followed by film-forming.

With the above-mentioned block copolymer of a styrene hydrocarbon with a conjugated diene hydrocarbon, the refractive index ($n_1$) can be adjusted substantially to the desired value by properly adjusting the compositional ratio of the styrene hydrocarbon to the conjugated diene hydrocarbon. Accordingly, by adjusting the compositional ratio of the styrene hydrocarbon to the conjugated diene hydrocarbon to correspond to the refractive index ($n_2$) of the polyester resin to be used for the surface layer (S layer), $n_1$ within a range of $n_2$±0.02 can be obtained. Such a prescribed refractive index may be adjusted solely by the block copolymer of the styrene hydrocarbon with the conjugated diene hydrocarbon, or may be adjusted by mixing two or more resins.

The storage elastic modulus (E') at 0° C. of the styrene resin contained in the intermediate layer (M layer) is preferably at least $1.00 \times 10^9$ Pa, more preferably at least $1.50 \times 10^9$ Pa. This storage elastic modulus (E') at 0° C. represents the rigidity of the film i.e. the elasticity of the film. When the resin has the storage elasticity modulus (E') of at least $1.00 \times 10^9$ Pa, when it is formed into a laminate film, it is capable of imparting elasticity (rigidity at room temperature) to the laminate film. Particularly, when the thickness of the laminate film is made thin, it is possible to prevent a phenomenon such that when a film formed into a bag is put on a container such as a pet bottle by a labeling machine, it is likely to be applied obliquely, or to prevent a decrease in the yield due to lack of elasticity of the film. Such a storage elastic modulus (E') can be obtained solely by the above-mentioned block copolymer of a styrene hydrocarbon with a conjugated diene hydrocarbon, by mixing two or more such copolymers, or by incorporating other resins within a range not to impair the transparency.

In a case where the styrene resin contained in the intermediate layer (M layer) is a mixture of block copolymers of the styrene hydrocarbon-conjugated diene hydrocarbon different in the styrene content, or a mixture of such a block copolymer with another resin, good results can be obtained by suitably selecting a resin for rupture-resistance, and a resin for rigidity. Namely, by a combination of a styrene hydrocarbon-conjugated diene hydrocarbon block copolymer having high rupture-resistance and such a copolymer having high rigidity or by mixing a styrene hydrocarbon-conjugated diene hydrocarbon block copolymer having high rupture-resistance with another type of resin having high rigidity, it is possible to adjust so that the total condition of styrene hydrocarbon-conjugated diene hydrocarbon, or the mixture thereof with another type of resin will satisfy the desired $n_1$ and storage elastic modulus (E') at 0° C.

Preferred as a styrene hydrocarbon-conjugated diene hydrocarbon block copolymer capable of imparting rupture-resistance is pure block SBS and random block SBS. Among them, particularly preferred is one having viscoelastic characteristics such that the storage elastic modulus (E') at 0° C. is from $1.00 \times 10^8$ Pa to $1.00 \times 10^9$ Pa, and at least one of peak temperatures of the loss elastic modulus (E") is at most $-20°$ C. When the storage elastic modulus at 0° C. is at least $1.0 \times 10^8$ Pa, it is possible to impart the elasticity by increasing the blend amount of the resin for rigidity. On the other hand, among peak temperatures of the loss elastic modulus (E"), the temperature on the low temperature side primarily represents rupture-resistance. Said characteristics vary depending upon the stretching conditions, but in a case where there is no peak temperature of the loss elastic modulus (E") in a state before stretching at a temperature of at most $-20°$ C., it may sometimes be difficult to impart sufficient film rupture-resistance to the laminate film.

The resin capable of imparting rigidity may, for example, be a copolymer containing a styrene hydrocarbon having a storage elastic modulus (E') at 0° C. of at least $2.00 \times 10^9$ Pa, such as a block copolymer of a styrene hydrocarbon with a conjugated diene hydrocarbon having the block structure controlled, a polystyrene or a copolymer of a styrene hydrocarbon with an aliphatic unsaturated carboxylate.

As the styrene hydrocarbon-conjugated diene hydrocarbon block copolymer having the block structure controlled, SBS may be mentioned wherein as a characteristic of a styrene-butadiene block copolymer, the storage elastic modulus (E') at 0° C. is at least $2.00 \times 10^9$ Pa. The styrene-butadiene compositional ratio of SBS satisfying such a condition is preferably adjusted to be styrene-butadiene=(95 to 80)/(5 to 20).

Now, an example of a polymerization method will be described whereby it becomes possible to satisfy the above-mentioned viscoelastic characteristics. Usually, a part of styrene or butadiene is charged and polymerized, and then, a mixture of a styrene monomer and a butadiene monomer is charged, whereupon a polymerization reaction is continued, whereby butadiene having a higher polymerization activity will be preferentially polymerized, and finally, a block composed of a single monomer of styrene will be formed. For example, if styrene is subjected firstly to homopolymerization, and after completion of the polymerization, a mixture of a styrene monomer and a butadiene monomer is charged, and the polymerization is continued, a styrene-butadiene block copolymer having a styrene-butadiene copolymer moiety having a styrene-butadiene ratio gradually changed between a styrene block and a butadiene block, will be obtained. By letting it have such a moiety, it is possible to obtain a polymer having the above-mentioned viscoelastic characteristics. In such a case, the above-mentioned two peaks attributable to the butadiene block and the styrene block cannot distinctly be ascertained, and on appearance, it looks as if only one peak is present. Namely, with a block structure such as a random block SBS wherein a pure block or a butadiene block is distinctly present, Tg attributable to the butadiene block will be present mainly at a temperature of at most 0° C., whereby it will be difficult to bring the storage elastic modulus (E') at 0° C. to be at least a prescribed value. Further, also with respect to the molecular weight, the measured value of MFR (measuring condition: temperature of 200° C., load of 49 N) is adjusted to be from 2 g/10 min to 15 g/10 min. The amount of the styrene-butadiene block copolymer to be mixed to impart such rigidity, is suitably adjusted depending upon the characteristics of the heat-shrinkable laminate film and is preferably adjusted within a range of from at least 20 mass %, preferably at least 40 mass %, and at most 80 mass %, preferably at most 70 mass % based on the total amount of resins constituting the intermediate layer (M layer). When it is at most 80 mass % of the total amount of resins, the rigidity of the film can be substantially improved, and it is also possible to suppress deterioration in the rupture-resistance. On the other hand, when it is at least 20 mass % of the total amount of resins, it is possible to impart sufficient rigidity to the film.

Adhesive Layer (AD Layer)

In the present invention, the adhesive layer (AD layer) is composed mainly of an adhesive resin. The adhesive resin may be a resin which is capable of bonding the surface layer (S layer) and the intermediate layer (M layer) not to be delaminated. For example, a copolymer of a vinyl aromatic hydrocarbon with a conjugated diene hydrocarbon, or its hydrogenated derivative is suitably employed. The form of the copolymer of a vinyl aromatic hydrocarbon with a conjugated diene hydrocarbon is not particularly limited, and it may be any form of a block copolymer, a random copolymer or a copolymer having a tapered block structure.

The vinyl aromatic hydrocarbon may, for example, be a styrene hydrocarbon, and a styrene homologue such as α-methylstyrene can suitably be employed. Whereas, the conjugated diene hydrocarbon may, for example, be 1,3-butadiene, isoprene or 1,3-pentadiene. Such conjugated diene hydrocarbons may be contained alone or in combination as a mixture of two or more of them. Further, the adhesive layer (AD layer) may contain a small amount of a third component in addition to the vinyl aromatic hydrocarbon and the conjugated diene hydrocarbon. Further, it is preferred that a double bond mainly composed of a vinyl bond at the conjugated diene portion is present, whereby affinity with the polyester resin of the surface layer (S layer) will function to improve the delamination strength (interlaminar adhesion strength).

In a case where as the adhesive resin, a copolymer of a styrene hydrocarbon with a conjugated diene hydrocarbon, or its hydrogenated derivative, is employed, the styrene content is at least 5 mass %, preferably at least 7 mass %, more preferably at least 10 mass %, and at most 40 mass %, preferably at most 37 mass %, more preferably at most 35 mass %, based on the total amount of the copolymer or its hydrogenated derivative. When the styrene content is at least 5 mass %, if the film of the present invention is returned to the surface layer (S layer) and/or the intermediate layer (M layer) (preferably the intermediate layer (M layer)), good compatibility can be obtained, and it is possible to suppress turbidity of the film. On the other hand, when the styrene content is at most 40 mass %, the flexibility of the adhesive layer (AD layer) will not be lowered, and when a stress is exerted to the film, it provides a buffering action to a stress caused between the surface layer (S layer) and the intermediate layer (M layer), whereby delamination can be suppressed.

As the hydrogenated derivative of the copolymer of a styrene hydrocarbon with a conjugated diene hydrocarbon, a hydrogenated derivative of a styrene-conjugated diene random copolymer is preferably employed. A detailed description and a production method of the hydrogenated derivative of a styrene-conjugated diene random copolymer are disclosed in JP-A-2-158643, JP-A-2-305814 and JP-A-3-72512.

The glass transition temperature (Tg) of the copolymer of a vinyl aromatic hydrocarbon with a conjugated diene hydrocarbon, or its hydrogenated derivative to be used for the adhesive layer (AD layer) is preferably at most 20° C., more preferably at most 10° C., more preferably at most 0° C. When the glass transition temperature (Tg) is at most 20° C. in a case where a force is exerted to the film of the present invention, the flexible adhesive layer (AD layer) serves as a buffering material, whereby delamination can be suppressed.

Here, the glass transition temperature (Tg) in the present invention is a value obtained a follows. Namely, using a viscoelasticity spectrometer DVA-200 (manufactured by IT Keisoku Co., Ltd.), measurements were carried out at an oscillation frequency of 10 Hz with a strain of 0.1% at a temperature raising rate of 3° C./min, and from the obtained data, the peak value of the loss elastic modulus (E") was obtained, and the temperature at that time was taken as Tg. In a case where a plurality of peaks of the loss elastic modulus (E") are present, the temperature at the peak value where the loss elastic modulus (E") shows the maximum value, is taken as Tg.

The above-mentioned copolymer of a vinyl aromatic hydrocarbon with a conjugated diene hydrocarbon, or its hydrogenated derivative, is commercially available, for example, as a styrene/butadiene block copolymer elastomer (TUFPRENE by Asahi Kasei Chemicals Corporation), a hydrogenated derivative of styrene/butadiene block copolymer (TUFTEC by Asahi Kasei Chemicals Corporation), KRANTON G, by Shell Japan), a hydrogenated derivative of a styrene/butadiene random copolymer (DYNALON by JSR Corporation), a hydrogenated derivative of a styrene/isoprene block copolymer (SEPTON by KURARAY CO., LTD.), or a styrene/vinylisoprene block copolymer elastomer (HYBAR by KURARAY CO., LTD.). These products may be used alone or in combination as a mixture of two or more of them.

By further introducing polar groups to the above-mentioned copolymer of a vinyl aromatic hydrocarbon with a conjugated diene hydrocarbon, or its hydrogenated derivate, it is possible to further improve the interlaminar adhesion with the surface layer (S layer) composed of a polyester resin composition. The polar groups to be introduced may, for example, be acid anhydride groups, carboxylic acid groups, carboxylic acid ester groups, carboxylic acid chloride groups, carboxylic acid amide groups, carboxylic acid salt groups, sulfonic acid groups, sulfonic acid ester groups, sulfonic acid chloride groups, sulfonic acid amide groups, sulfonic acid salt groups, epoxy groups, amino groups, imide groups, oxazoline groups or hydroxyl groups. As the copolymer of a vinyl aromatic compound with a conjugated diene having polar groups introduced, or its hydrogenated derivative, maleic anhydride-modified SEBS, maleic anhydride-modified SEPS, epoxy-modified SEBS or epoxy-modified SEPS may be mentioned as typical examples. Specifically, TUFTEC by Asahi Kasei Chemicals Corporation or EPOFRIEND by DAICEL CHEMICAL INDUSTRIES, LTD., is, for example, commercially available. These copolymers may be used alone or in combination as a mixture of two or more of them.

As the resin to constitute the adhesive layer (AD layer), other than the above-mentioned vinyl aromatic hydrocarbon-conjugated diene hydrocarbon copolymer or the like, a resin mixture comprising a polyester resin to be used for the surface layer (S layer) and a styrene resin to be used for the intermediate layer (M layer) may also be employed. By using such a resin mixture for the adhesive layer, it is possible to bond the polyester resin contained in the surface layer (S layer) to the polyester resin component contained in the adhesive layer (AD layer), and to bond the styrene resin contained in the intermediate layer (M layer) to the styrene resin component contained in the adhesive layer (AD layer), thereby to further improve the bond strength between the two layers. The blend ratio of the polyester resin/the styrene resin in the mixture is, by mass % ratio, (20 to 80)/(80 to 20), preferably (30 to 70)/(70 to 30), more preferably (40 to 60)/(60 to 40), with a view to improvement of the bonding effects with the adjacent layers. By incorporating at least 20 mass % of each of the two resins in the resin composition constituting the adhesive layer, good bonding effects with the corresponding layers will be obtained.

Other than the above resin mixture, the resin to constitute the adhesive layer (AD layer) may also be preferably one resin or a mixture of two or more resins selected from the group consisting of a soft styrene resin, a modified styrene resin, and a resin which has polar groups having a high affinity or reactive with the above polyester resin and which is compatible with the above polystyrene resin (hereinafter referred to as "the specific adhesive resin").

The soft styrene resin is a resin comprising from 10 mass % to 50 mass %, preferably from 10 mass % to 40 mass %, of a styrene copolymer, and an elastomer. A resin to be suitably used as the elastomer component may, for example, be butadiene, isoprene or 1,3-pentadiene.

Specific examples of the soft styrene resin include a styrene-butylacrylate copolymer, a styrene-butadiene block copolymer (SBS), a styrene-isoprene block copolymer (SIS), a styrene-ethylene-propylene copolymer, and an elastomer having a styrene-ethylene-butylenes copolymer or the like modified by a modifier having a polar group. Further, the block copolymer includes a pure block, a random block or a tapered block, and the form of the copolymer is not particularly limited. Further, such block units may be repeated. Specifically, in the case of a styrene-butadiene block copolymer, block units may be repeated as in a styrene-butadiene copolymer, a styrene-butadiene-styrene block copolymer or a styrene-butadiene-styrene-butadiene block copolymer.

Further, as the soft styrene resin, a resin having hydrogen added to SBS or SIS, such as a hydrogenated styrene/butadiene block copolymer (SEBS) or a hydrogenated styrene/isoprene block copolymer (SEPS) may also be used. As a specific commercial product of a hydrogenated elastomer, "TUFTEC H series" (Asahi Kasei Chemicals Corporation) may, for example, be suitably employed.

As the modified styrene resin, a modified styrene elastomer containing a large amount of an elastomer component is suitably employed. Among them, modified products of SEBS and SEPS are preferably employed. Specifically, maleic anhydride-modified SEBS, maleic anhydride-modified SEPS, epoxy-modified SEBS or epoxy-modified SEPS may, for example, be mentioned. The modified styrene (elastomers) may be used alone or in combination as a mixture of two or more of them. As a specific commercial product of the modified styrene resin, a polymer having a hydrogenated styrene thermoplastic elastomer modified with highly reactive functional groups "TUFTEC M1943" (Asahi Kasei Chemicals Corporation) or "Polar group-modified DYNALON" (JSR Corporation) may, for example, be mentioned.

Further, as the resin to constitute the adhesive layer (AD layer), other than the above-described soft styrene resin or modified styrene resin, it is possible to employ a resin which has polar groups having a high affinity or reactive with a polyester resin and which is compatible with a styrene resin (the specific adhesive resin).

The specific adhesive resin is a styrene block copolymer or a graft copolymer which has polar groups having a high affinity with the polyester resin contained in the surface layer (S layer) or polar groups reactive with such a polyester resin and which has a moiety compatible with the styrene resin contained in the intermediate layer (M layer). Specific examples of the polar groups having high affinity with the polyester resin or the functional groups reactive therewith include functional groups such as acid anhydride groups, carboxylic acid groups, carboxylic acid ester groups, carboxylic acid chloride groups, carboxylic acid amide groups, carboxylic acid salt groups, sulfonic acid groups, sulfonic acid ester groups, sulfonic acid chloride groups, sulfonic acid amide groups, sulfonic acid salt groups, epoxy groups, amino groups, imide groups, or oxazoline groups. Among them, acid anhydride groups, carboxylic acid groups or carboxylic acid ester groups are preferred.

Further, to have a moiety compatible with the styrene resin means to have a chain having an affinity with the styrene resin. More specifically, a random copolymer may, for example, be mentioned which has a styrene chain or a styrene copolymer segment as the main chain, block chain or graft chain, or which has styrene monomer units.

A specific commercial product of the above specific adhesive resin may, for example, be EPOFRIEND (DAICEL CHEMICAL INDUSTRIED, LTD.) or "RESEDA" (TOAGOSEI CO., LTD.).

The resin to be used for the adhesive layer (AD layer) is not limited to a single substance of the above-mentioned soft styrene resin, the modified styrene resin or the specific adhesive resin, but two or more of them may be used as mixed. In such a case, the mixing ratio may suitably be determined depending upon the characteristics of the resins to be used.

In the present invention, to the surface layer (S layer), the intermediate layer (M layer) and/or the adhesive layer (AD layer), in addition to the above-described components, a recycled resin from a trimming loss such as film edges, inorganic particles such as silica, talc, kaolin and calcium carbonate, pigments such as titanium oxide and carbon black, and additives such as a flame retardant, a weather resistance stabilizer, a heat stabilizer, an antistatic agent, a melt viscosity-improving agent, a crosslinking agent, a lubricant, a nucleating agent, a plasticizer and an aging-preventive agent, may suitably be incorporated for the purpose of improving or adjusting the molding processability, the productivity or various physical properties of the heat-shrinkable film, within a range not to substantially impair the effects of the present invention.

Layer Structure of the Film

Of the heat-shrinkable film of the present invention, the layer structure is not particularly limited so long as it is a structure having at least three layers with the adhesive layer (AD layer) between the surface layer (S layer) and the intermediate layer (M layer). Here, the surface layer (S layer) may be the surface layer (S layer) constituting the outermost layer, but a similar layer may be used as an intermediate layer (M layer).

In the present invention, a preferred laminate structure is a five layer structure comprising surface layer (S layer)/adhesive layer (AD layer)/intermediate layer (M layer)/adhesive layer (AD layer)/surface layer (S layer). By adopting this layer structure, it is possible to obtain, with good productivity and economical efficiency, a heat-shrinkable laminate film which is excellent in the elasticity (rigidity at room temperature) of the film, the shrink finishing quality, the rupture-resistance, the transparency when returned (when incorporated as recycled) and which has little natural shrinkage and has delamination of the film suppressed, and thus suitable for application to shrink packaging, shrink bundling packaging or shrink labels, to accomplish the object of the present invention.

Now, a film having a five layer structure of (S layer)/(AD layer)/(M layer)/(AD layer)/(S layer) wherein (S layer) represents the surface layer, (M layer) an intermediate layer and (AD layer) an adhesive layer, will be described as one of preferred embodiments of the present invention.

The thickness ratio of the respective layers may be set by taking the above-described functional effects into consideration and is not particularly limited. The thickness ratio of the surface layer (S layer) to the entire thickness of the film is at least 10%, preferably at least 15%, more preferably at least 20%, and the upper limit of the thickness ratio is at most 50%, preferably at most 45%, more preferably at most 40%. Further, the thickness ratio of the intermediate layer (M layer) to the total thickness of the film is at least 20%, preferably at least 25%, more preferably at least 30%, and the upper limit is at most 80%, preferably at most 75%, more preferably at most 70%. Further, the adhesive layer (AD layer) is at least 0.5 µm, preferably at least 0.75 µm, more preferably at least 1 µm, and its upper limit is at most 6 µm, preferably at most 5 µm, from its function. If the thickness ratio of each layer is within the above range, it is possible to obtain in a good balance, a heat-shrinkable laminate film which is excellent in the elasticity (rigidity at room temperature) of the film, the shrink finishing quality, the rupture-resistance and the transparency when incorporated as recycled and which has little natural shrinkage and has delamination of the film suppressed, and thus is suitable for application to shrink packaging, shrink bundling packaging or shrink labels.

The total thickness of the film of the present invention is not particularly limited, but the thinner, the better from the viewpoint of the transparency, shrink processing, raw material costs, etc. Specifically, the total thickness of the film after stretching is at most 80 µm, preferably at most 70 µm, more preferably at most 50 µm, most preferably at most 40 µm. The lower limit in the total thickness of the film is not particularly limited, but in view of handling efficiency of the film, it is preferably at least 20 µm.

Physical Properties

With the film of the present invention, it is important that its heat shrinkage when dipped in warm water of 80° C. for 10 seconds, is at least 30% in at least one direction.

In this specification, "at least one direction" means either the main shrink direction or a direction perpendicular to the main shrink direction, or both directions, and it usually means the main shrink direction. Here, "the main shrink direction" means the direction in which the heat shrinkage is larger between the machine direction (the lengthwise direction) of the film and the transverse direction (the width direction) of the film, and for example, in a case where the film is applied to a bottle, it means the direction corresponding to the outer circumferential direction. The "perpendicular direction" means a direction perpendicular to the main shrink direction.

This will be an index for judging the applicability to a shrink processing step in a relatively short period (from a level of a few seconds to a few tens seconds), for example, in an application as a shrink label for a pet bottle. For example, the shrinkage required for a heat shrinkage film to be applied as a shrink label for a pet bottle varies depending upon its shape, but is usually within a range of from 20% to 70%.

A shrink processing machine which is presently industrially most commonly employed for application to labels for pet bottles is one so-called a steam shrinker which employs steam as a heating medium to carry out the shrink processing. Further, the heat-shrinkable film is required to sufficiently undergo heat shrinkage at a temperature as low as possible from the viewpoint of e.g. an influence of heat to the object to be covered. In consideration of such an industrial productivity, a film having a heat shrinkage of at least 30% under the above conditions is preferred, since it can sufficiently closely be adhered to the object to be covered within the shrink processing time. For this purpose, its heat shrinkage when it is dipped in warm water of 80° C. for 10 seconds is at least 30%, preferably at least 35%, more preferably at least 40%, and its upper limit is at most 75%, preferably at most 70%, more preferably at most 65%, in at least one direction, usually in the main shrink direction.

Further, in a case where the film of the present invention is to be used as a heat-shrinkable label, the heat shrinkage in the perpendicular direction is preferably at most 10%, more preferably at most 5%, further preferably at most 3%, when it is dipped warm water of 80° C. for 10 seconds. With a film having a heat shrinkage in the perpendicular direction being at most 10%, it is free from a trouble such that the dimension in the perpendicular direction after the heat shrinkage tends to be short, a distortion or the like is likely to form on the printed design or the letter after the shrinkage, or in the case of an angular bottle, it is free from a trouble such as a machine sink, such being desirable.

With the film of the present invention, the heat shrinkage when it is dipped in warm water of 70° C. for 10 seconds is at least 5%, preferably at least 10%, more preferably at least 15%, and its upper limit is less than 30%, preferably at most 27%, more preferably at most 25%, in at least one direction, usually in the main shrink direction. By adjusting the heat shrinkage in the main shrink direction at 70° C. to be at least 5%, preferably at least 10%, it is possible to suppress shrink irregularities which may locally take place and consequently suppress formation of wrinkles or pockmarks. Further, by adjusting the upper limit of the heat shrinkage to be less than 30%, preferably at most 25%, it is possible to suppress extreme shrinkage at a low temperature, and it is for example possible to maintain the natural shrinkage to be small even under a high temperature environment in summer time. Further, the heat shrinkage in the perpendicular direction when it is dipped in warm water of 70° C. for 10 seconds is preferably at most 10%, more preferably at most 5%, further preferably at most 3%.

The natural shrinkage of the film of the present invention should better be as small as possible. Usually, the natural shrinkage of a heat-shrinkable film is preferably such that the natural shrinkage after storage at 30° C. for 30 days is at most 3.0%, preferably at most 2.0%, more preferably at most 1.5%. If the natural shrinkage under the above conditions is at most 3.0%, even if the film prepared is stored for a long period of time, it may be applied stably on e.g. a container without any practical problem.

With the film of the present invention, from the viewpoint of the elasticity (rigidity at room temperature), it is important that the tensile modulus of elasticity in a direction perpendicular to the main shrink direction of the film is at least 1,200 MPa, more preferably at least 1,300 MPa, further preferably at least 1,400 MPa. Further, the upper limit value of the tensile modulus of elasticity of heat-shrinkable films usually used, is about 3,000 MPa, preferably about 2,900 MPa, more preferably about 2,800 MPa. When the tensile modulus of elasticity in a direction perpendicular to the main shrink direction of the film is at least 1,200 MPa, the elasticity (rigidity at room temperature) over the entire film can be made high, and even when the film thickness is made particularly thin, there will be no such problem that when a film formed into a bag is applied on a container such as a pet bottle by e.g. a labeling machine, the yield decreases by e.g. bending of the film or oblique application of the film, such being desirable. The tensile modulus of elasticity can be measured in accordance with JIS K7127 under a condition of 23° C. Further, the tensile modulus of elasticity in the main shrink direction of the film is not particularly limited so long as sufficient elasticity of the film can be obtained, but it is usually at least 1,500 MPa, preferably at least 2,000 MPa, more preferably at least 2,500 MPa, and its upper limit is at most 6,000 MPa, preferably at most 4,500 MPa, more preferably at most 3,500 MPa. By adjusting the tensile modulus of elasticity in the main shrink direction of the film to be within the above range, it is possible to increase the elasticity of the film in both directions, such being desirable.

With respect to the transparency of the film of the present invention, when a film having a thickness of 50 µm is measured in accordance with JIS K7105, the haze value is preferably at most 10%, more preferably at most 7%, further preferably at most 5%. When the haze value is at most 10%, the transparency of the film can be secured to provide a display effect.

Further, even in a case where the film of the present invention recycled to the surface layer (S layer) and the intermediate layer (M layer), preferably to the intermediate layer (M layer), is at most 40 mass %, preferably at most 35 mass %, more preferably at most 30 mass %, based on the total amount of the film, the haze value of the film of the present invention having a thickness of 50 µm as measured in accordance with JIS K7105 is at most 10%, preferably at most 7%, more preferably at most 5%. When the haze value after the recycled product is again incorporated, is at most 10%, good transparency of the regenerated film can be maintained.

The rupture-resistance of the film of the present invention is evaluated by the tensile elongation, and in a tensile test in an environment of 0° C., particularly in an application as labels, the elongation in the machine direction (MD) of the film is at least 100%, preferably at least 200%, more preferably at least 300%.

The delamination strength (seal strength) of the film of the present invention is at least 2N/15 mm width, preferably at least 4N/15 mm width, more preferably at least 6N/15 mm width by means of the measuring method disclosed Examples given hereinafter (method of the delamination at a test speed of 200 mm/min in the TD direction by a T type peeling method in an environment of 23° C. under 50% RH). Further, the upper limit of the interlaminar peel strength is not particularly limited, but from the viewpoint of the solvent resistance of the film surface, it is preferably at a level of 15N/15 mm width. With the film of the present invention, the delamination strength is at least 3N/15 mm width, whereby it is free from such a trouble that during the use, the sealed portion is peeled off. Further, the delamination strength given after the heat shrinkage of the film of the present invention is good, and the same strength as the above-mentioned delamination strength before the heat shrinkage can be maintained.

The film of the present invention can be produced by a known method. The form of the film may be flat or tubular, but a flat form is preferred from the viewpoint of the productivity (the original film may be divided in the width direction for a number of products) or from such a viewpoint that printing can be made on the inner surface. As a method for producing a flat film, a method may, for example, be mentioned wherein resins be melted by means of a plurality of extruders, co-extruded from T-dies, cooled and solidified by chilled rolls, roll-stretched in a machine direction, tenter-stretched in a transverse direction, annealed, cooled (in a case where printing is to be applied, corona discharge treatment is applied to the surface), and wound by a winding machine, to obtain a film. Otherwise, a method may be employed wherein a tubular film produced by a tubular method is cut into a flat film.

In an application for shrinkage into two directions, such as for overwrap, the stretch ratio is from twice to ten times in the machine direction and from twice to ten times the transverse direction, preferably from three times to six times in the machine direction and from three times to six times in the transverse direction. On the other hand, in an application for shrinkage primarily in one direction, such as for heat-shrinkable labels, it is preferred to select a stretch ratio belonging substantially to monoaxial stretching i.e. from twice to ten times, preferably from four times to eight times, in a direction corresponding to the main shrink direction, and from once to twice (once means a non-stretched case), preferably from 1.1 times to 1.5 times, in a direction perpendicular thereto. A biaxially stretched film which is stretched at a stretch ratio within the above range is free from such trouble that the heat shrinkage in a direction perpendicular to the main shrink direction tends to be too large, and for example, it is possible and desirable to suppress a so-called machine shrinkage cavity phenomenon such that when used as a shrink label, the film when applied to the container, undergoes heat-shrinkage also in the direction of the height of the container.

The stretching temperature is required to be changed depending upon the properties required for the heat-shrinkable film or the glass transition temperature of the resin composition to be used. However, it is generally controlled within a range of at least 60° C., preferably at least 70° C. and at most 130° C., preferably at most 110° C. Further, the stretch ratio is suitably determined in a monoaxial direction or biaxial directions within a range of from 1.5 times to 10 times, preferably from 3 times to 7 times, more preferably from 3 times to 5 times, in the main shrink direction, depending upon the characteristics of the resin to be used, the stretching means, the stretching temperature, the form of the desired product, etc. Further, even in the case of monoaxial stretching in the transverse direction, it is effective to impart slight stretching at a level of from 1.05 times to 1.8 times in the vertical direction for the propose of e.g. improvement of the mechanical properties of the film. Then, the stretched film is, if necessary, subjected to heat treatment or relaxation treatment at a temperature of from about 50° C. to 110° C. for the purpose of e.g. reduction of natural shrinkage or improvement of the heat shrinking properties, and then readily cooled within a time wherein no molecular orientation will be loosened up, to obtain a heat-shrinkable film.

Further, the film of the present invention may be subjected to surface treatment or surface processing, such as corona treatment, printing, coating or vapor deposition, as the case requires, and further may be subjected to bag-making processing by various solvents, or heat sealing, or perforation treatment.

Depending upon the object to be packaged, the film of the present invention may be processed from a flat form to a cylindrical form and then used for packaging. In the case of a cylindrical container such as a pet bottle which requires printing, a necessary image is printed on one side of a flat film with a large width wound up on a roll, and the film is cut into a necessary width, followed by folding back so that the printed surface is located inside and then by center sealing (the form of the sealed portion is so-called envelope sealing) to form a cylinder. The center sealing method may, for example, be a bonding method by means of an organic solvent, a method by means of heat sealing, a method by means of an adhesive or a method by means of an impulse sealer. Among them, a bonding method by means of an organic solvent is preferably used from the viewpoint of the productivity and appearance.

Molded Product, Heat-Shrinkable Label and Container

The film of the present invention is excellent in shrink finishing quality of the film, transparency, rupture-resistance, etc., and its applications are not particularly limited. By forming a printed layer, a vapor deposition layer or any other functional layer as the case requires, it may be used as various molded products such as bottles (blow bottles), trays, lunch boxes, prepared food containers and milk product containers. Especially when the film of the present invention is employed as a heat-shrinkable label for a food product container (such as a PET bottle or a glass bottle for a soft drink or food product, preferably a PET bottle), it can be closely fit to the shape even if the container has a complicated shape (for example, a cylinder with the center constricted, an angular square cylinder, a pentagonal cylinder, a hexagonal cylinder, etc.), and it is possible to obtain a container having a beautiful label applied without wrinkles or pockmarks. The molded product and the container of the present invention can be prepared by using a usual bonding method.

The film of the present invention has excellent low temperature shrinkability and shrink finishing quality and thus is suitably used not only as the base material for a heat-shrinkable label for a plastic molded product which undergoes a deformation when heated at a high temperature, but also as a base material for a heat-shrinkable label for a package body (container) employing as a constituting base material at least one member selected from metal, porcelain, glass, paper, a polyolefin resin such as polyethylene, polypropylene or polybutene, a polymethacrylate resin, a polycarbonate resin, a polyester resin such as polyethylene terephthalate or polybutylene telephthalate, and a polyamide resin, as a material having a thermal expansion coefficient or water absorptivity which is extremely different from the heat-shrinkable film of the present invention.

The materials to constitute plastic packages for which the film of the present invention is useful may, for example, be in addition to the above-mentioned resins, a polystyrene, a rubber-modified impact resistant polystyrene (HIPS), a styrene-butylacrylate copolymer, a styrene-acrylonitrile copolymer, a styrene-maleic anhydride copolymer, an acrylonitrile-butadiene-styrene copolymer (ABS), a (meth)acrylic acid-butadiene-styrene copolymer (MBS), a polyvinyl chloride resin, a phenol resin, a urea resin, a melamine resin, an epoxy resin, an unsaturated polyester resin, and a silicon resin. These plastic packages may be a mixture or laminate of two or more resins.

EXAMPLES

Now, the present invention will be described with reference to Examples.

Here, the measurements and evaluations shown in Examples, were carried out as follows. In Examples, the withdrawing (flow) direction of a laminate film is represented by a "machine" direction (MD), and a direction perpendicular thereto is represented by a "transverse" direction (TD).

(1) Tensile Modulus of Elasticity

In accordance with JIS K7127, the measurements were carried out in the main shrink direction (transverse direction) and a direction (the machine direction) perpendicular to the main shrink direction, of the film under a condition of a temperature of 23° C. Further, the results evaluated by the following standards, were also indicated.

(⊚): The tensile modulus of elasticity is at least 1,400 MPa.
(◯): The tensile modulus of elasticity is at least 1,200 MPa and less then 1,400 MPa.
(×): The tensile modulus of elasticity is less than 1,200 MPa.

(2) Heat Shrinkage

A film was cut into a size of 100 mm in length and 100 mm in width, and in a first embodiment, it was dipped in warm water baths at 70° C. and 80° C. for ten seconds, respectively, and in a second embodiment, it was dipped in warm water baths of 70° C., 80° C. and 90° C. for ten seconds, respectively, whereby the shrinkages were measured. For the heat shrinkage, the ratio of the shrinkage to the original size before the shrinkage in the transverse direction was represented by a % value.

(3) Natural Shrinkage

A film was cut into a size of 100 mm in length and 1,000 mm in width and left in a constant temperature tank in an atmosphere of 30° C. for 30 days, whereupon the shrinkage against the original size before the shrinkage was measured with respect to the main shrink direction, and the ratio was represented by a % value.

(4) Haze Value

In accordance with JIS K7105, the haze value of the film was measured in a film thickness of 50 μm.

(5) Tensile Elongation at Break

In accordance with JIS K7127, the measurements were carried out in a direction (machine direction) perpendicular to the main shrink direction under conditions of a temperature of 23° C. and a test speed of 200 mm/min.

(6) Low Temperature Tensile Elongation at Break

In accordance with JIS K7127, the measurements were carried out in a direction (machine direction) perpendicular to the main shrink direction of the film under conditions of a temperature of 0° C. and a test speed of 200 mm/min.

(7) Tensile Modulus of Elasticity of Intermediate Layer (M Layer)

Resin pellets for the intermediate layer (M layer) were formed into a film (thickness: 100 μm) by a hot press processing machine under conditions of 200° C., 10 MPa, and 10 minutes, and then, in accordance with JIS K7127, the tensile modulus of elasticity was measured under a condition of a temperature of 23° C.

(8) Glass Transition Temperature (Tg) of the Resin for Adhesive Layer (AD Layer)

Resin pellets for the adhesive layer (AD layer) were formed into a film (thickness: 100 μm) by a hot press processing machine under conditions of 200° C., 10 MPa, and 10 minutes, and then, the sample was cut out in a size of 4 mm in length and 60 mm in width. Using a viscoelasticity spectrometer DVA-200 (manufactured by IT Keisoku Co., Ltd.), the measurements were carried out from −50 to 150° C. at an oscillation frequency of 10 Hz, with a strain of 0.1%, at a temperature-rising rate of 3° C./min and a chuck distance of 25 mm, and from the obtained data, the peak value of the loss elastic modulus (E") was obtained, and the temperature at that time was taken as the glass transition temperature (Tg).

(9) Interlaminar Peel Strength

The seal strength of a film was measured, and the interlaminar peel strength was evaluated. A film was bonded at positions of 10 mm from both edges in the transverse direction of the film by means of a solvent mixture comprising 90 mass % of THF and 10 mass % of n-hexane, to obtain a cylindrical label. The sealed portion was cut out with a width of 5 mm in a direction perpendicular to the circumference, and the cut out specimen was subjected to a peel test by using a constant temperature tank-equipped tensile tester ("201X", manufactured by INTESCO Co., Ltd.). The seal strengths of the front and rear layers and the intermediate layer were evaluated by the following numerical values.

(⊚): The seal strength is at least 4N/15 mm width
(◯): The seal strength is at least 2N/15 mm width and less than 4N/15 mm width
(×): The seal strength is less than 2N/15 mm width

(10) Shrink Finishing Quality

A film printed with a grating with spacings of 10 mm was cut out in a size of 100 mm in length (MD)×298 mm in width (TD), and both edges of TD were overlaid one on another for 10 mm and bonded by e.g. a solvent to obtain a cylindrical film. This cylindrical film was applied on a cylindrical pet bottle having a capacity of 1.5 L and passed through a shrink tunnel having a length of 3.2 m (3 zones) of a steam heating system without rotation in about 4 seconds. The atmosphere temperatures in the tunnel at the respective zones were adjusted within a range of from 70 to 85° C. by adjusting the amount of steam by a steam valve. After covering, the film was evaluated by the following standards.

(⊚): Shrinkage was sufficient, and no wrinkles, pockmarks or distortion of the grating was observed.
(◯): Shrinkage was sufficient, and wrinkles, pockmarks or distortion of the grating was slightly observed.
(×): Shrinkage was sufficient, but wrinkles, pockmarks or distortion of the grating was distinctly observed.

(11) Haze Value of the Film after Returned

The obtained heat-shrinkable laminate film was pulverized by a pulverizer, again palletized and then returned to the intermediate layer (M layer) in an amount corresponding to 30 mass % based on the total amount of the film, whereupon in the same manner as in each Example, a film having the recycled material incorporated was obtained. Using the obtained film having a thickness of 50 μm, the haze value was measured in accordance with JIS K7105. Further, the results of the evaluation by the following standards are also indicated.

(⊚): The haze value is less than 7%.
(◯): The haze value is at least 7% and less than 10%.
(×): The haze value is at least 10%.

Example A-1

A film of a first embodiment of the present invention was prepared as follows, and then, the obtained film was evaluated. As shown in Table 1, a polyester resin (a copolymer polyester comprising 100 mol % of terephthalic acid as the dicarboxylic acid component, and 70 mol % of ethylene glycol and 30 mol % of 1,4-cyclohexanedimethanol as the glycol component, trade name PETG copolyester6763, manufactured by Eastman Chemical Company, hereinafter referred to as "PETG") for a surface layer (S layer), a resin mixture comprising 50 mass % of a styrene resin A (styrene-butadiene=90/10, storage elastic modulus E' (0° C.): 3.15× $10^9$ Pa, peak temperature of loss elastic modulus E": 55° C., hereinafter referred to as "SBS-A") and 50 mass % of a styrene resin B (styrene-butadiene-isoprene=71/14/15, storage elastic modulus E' (0° C.): 4.03×$10^8$ Pa, peak temperature of loss elastic modulus E": −32° C., hereinafter referred to as "SBS-B") for an intermediate layer (M layer) and a resin mixture comprising 50 mass % of the polyester resin used for the surface layer (S layer) and 50 mass % of the styrene resin used for the intermediate layer (M layer), for an adhesive layer, were melted by extruders set within a range of from 210° C. to 230° C. in extrusion amounts at a ratio of intermediate layer:adhesive layer:surface or rear layer=3:1:1 and joined at a spinneret and extruded in five layers with three types (extrusion amount ratio=1:1:6:1:1) and cooled by cast rolls to obtain a non-stretched film having a thickness of 300 μm. This non-stretched film was stretched 1.3 times in the flow direction (MD) at 80° C. and then stretched 4.05 times in its perpendicular direction (TD) at 94° C. to obtain a laminate film having a thickness of about 50 μm.

Overall evaluation was carried out under such a standard that a film with ⊚ in all of the evaluation items was rated by (⊚), a film containing ○ was rated by (○), and a film with × in any one of the evaluation items was rated by (×). The results of the evaluation are shown in Table 2.

Example A-2

A film of the first embodiment was prepared in the same manner as in Example A-1 except that as shown in Table 1, as the adhesive layer (AD layer), a styrene thermoplastic elastomer resin (styrene content: 20 mass %, Tg: −45° C., trade name TUFTEC M1943, manufactured by Asahi Kasei Chemicals Corporation, hereinafter referred to as "AD") was used, and the non-stretched film was stretched 1.3 times in a machine direction (MD) at 75° C., and then stretched 4.0 times in the transverse direction (TD) at 92° C. The obtained film was evaluated, and the results are shown in Table 2.

Example A-3

A film of the first embodiment was prepared in the same manner as in Example A-1 except that as shown in Table 1, as the adhesive layer (AD layer), a styrene thermoplastic elastomer resin (styrene content: 20 mass %, Tg: −45° C., trade name Tuftec M1943, manufactured by Asahi Kasei Chemicals Corporation, hereinafter referred to as "AD") was used, and the non-stretched film was stretched 1.3 times in a machine direction (MD) at 75° C., and then stretched 4.0 times in the transverse direction (TD) at 92° C. The obtained film was evaluated, and the results are shown in Table 2.

Comparative Example A-1

As shown in Table 1, a resin mixture comprising 50 mass % of SBS-A and 50 mass % of SBS-B for an intermediate layer, and PETG as a front or rear layer, were melted by extruders set within a range of from 210° C. to 230° C. in extrusion amounts in a ratio of intermediate layer:surface or rear layer=3:1, joined at a spinneret, extruded in three layers with two types (extrusion amount ratio=1:6:1) and cooled by cast rolls to obtain a non-stretched film having a thickness of 300 μm. This non-stretched film was stretched 1.3 times in a flow direction (MD) at 80° C. and then stretched 4.4 times in the perpendicular direction (TD) at 97° C. to obtain a laminate film having a thickness of about 50 μm. It was evaluated in the same manner as in Example A-1, and the results are shown in Table 2.

TABLE 1

|  |  | Examples | | | Comparative Example |
|---|---|---|---|---|---|
|  |  | A-1 | A-2 | A-3 | A-1 |
| S layer (mass %) | PETG | 100 | 100 | 100 | 100 |
| AD layer | SBS-A | 50 | 50 |  | — |

TABLE 1-continued

|  |  | Examples | | | Comparative Example |
|---|---|---|---|---|---|
|  |  | A-1 | A-2 | A-3 | A-1 |
| (mass %) | SBS-B | 50 | 50 |  |  |
|  | AD |  |  | 100 |  |
| M layer (mass %) | SBS-A | 50 |  | 50 | 50 |
|  | SBS-B | 50 |  | 50 | 50 |
|  | SBS-C |  | 100 |  |  |

TABLE 2

|  |  | Examples | | | Comparative Example |
|---|---|---|---|---|---|
|  |  | A-1 | A-2 | A-3 | A-1 |
| Tensile modulus of elasticity (MPa) | MD | 1,430 | 1,310 | 1,360 | 1,780 |
|  | TD | 1,870 | 2,320 | 2,050 | 2,100 |
| TD heat shrinkage (%) | 70° C. | 23.0 | 25.0 | 26.0 | 23.0 |
|  | 80° C. | 50.0 | 49.0 | 47.0 | 49.0 |
| Natural shrinkage (%) |  | 0.40 | 0.64 | 0.64 | 0.44 |
| Haze (%) |  | 2.1 | 2.5 | 2.3 | 1.8 |
| Tensile Elongation at Break (%) |  | 297 | 325 | 307 | 202 |
| Seal strength (N/15 mm width) |  | 3.6 | 3.7 | 5.3 | 1.5 |
|  |  | ○ | ○ | ⊚ | X |
| Shrink finishing quality |  | ⊚ | ⊚ | ⊚ | ⊚ |
| Haze after returned (%) |  | 2.6 | 2.9 | 5.9 | 2.5 |
|  |  | ⊚ | ⊚ | ⊚ | ⊚ |
| Overall evaluation |  | ⊚ | ⊚ | ⊚ | X |

From Tables 1 and 2, it is evident that with the films of the present invention (Examples A-1 to A-3), the tensile elongation at 0° C. is large, and delamination is little as compared with the heat-shrinkable film comprising three layers (intermediate layer: polystyrene resin, front and rear layers: ethylene resin) having no adhesive layer (Comparative Example A-1). Further, the tensile modulus of elasticity and the shrink finishing quality of the films of the present invention (Examples A-1 to A-3) are equal to the conventional film (Comparative Example A-1). It is thereby evident that the films of the present invention have excellent low temperature shrinkability and have delamination suppressed as compared with the conventional film, and they are heat-shrinkable films having rigidity and shrink finishing quality equal to the conventional film.

Example B-1

A film of a second embodiment of the present invention was prepared as follows and then, the obtained film was evaluated.

As shown in Table 3, PETG copolyester6763 manufactured by Eastman Chemical Company (terephthalic acid: 100 mol %, ethylene glycol: 70 mol %, 1,4-cyclohexanedimethanol: 30 mol %, hereinafter referred to simply as "PETG") as a polyester resin for a surface layer (S layer), a resin composition having 0.3 part by mass of an antioxidant (Sumilizer GS, trade name, manufactured by Sumitomo Chemical Co., Ltd.) added to 100 parts by mass of a mixed resin composition comprising 45 mass % of SBS (styrene/butadiene=90/10, storage elastic modulus E'=2.5×10⁹ Pa, peak temperature of loss elastic modulus E"=54° C., hereinafter referred to simply as "SBS1") and 55 mass % of SBS (styrene/butadiene=71/29, storage elastic modulus E'=2.1×10⁸ Pa, peak temperature of loss elastic modulus E"=−46° C. and 84° C., hereinafter referred to simply as "SBS2") as styrene resins, for an intermediate layer (M layer), and SIS (KRATON D1124, manufactured by JSR Kraton Polymer, styrene content: 30 mass %, Tg: −56° C., hereinafter referred to simply as "AD1") as a copolymer of a vinyl aromatic hydrocarbon with a conjugated diene hydrocarbon, for an adhesive layer (AD layer), were, respectively, put into separate single screw extruders, manufactured by MITSUBISHI HEAVY INDUSTRIES, LTD., melt-mixed at a set temperature of 230° C., then co-extruded from dies in five layers with three types so that thicknesses of the respective layers would be surface layer (S layer)/adhesive layer (AD layer)/intermediate layer (M layer)/adhesive layer (AD layer)/surface layer (S layer)=40 μm/10 μm/150 μm/10 μm/40 μm, withdrawn by cast rolls at 50° C. and cooled for solidification to obtain a non-stretched laminate sheet having a width of 300 mm and a thickness of 250 μm. Then, by a film tenter manufactured by KYOTO MACHINERY CO., LTD., it was stretched 5.0 times in a transverse monoaxial direction at a preheating temperature at 110° C. and at a stretching temperature of 94° C. and then quenched with cool air to obtain a heat-shrinkable laminate film having a thickness of 50 μm.

Overall evaluation was carried out under such a standard that a film with ⊚ in all of the evaluation items was rated by (⊚), and a film containing ○ was rated by (○), and a film with × in any one of the evaluation items was rated by (×). The results of the evaluation are shown in Table 4.

Example B-2

A heat-shrinkable laminate film was obtained in the same manner as in Example 1 except that as shown in Table 3, in Example B-1, the mass ratio of SBS1 to SBS2 used for the intermediate layer (M layer) was changed to 35 mass % of SBS1 and 65 mass % of SBS2. The obtained film was evaluated, and the results are shown in Table 4.

Example B-3

A heat-shrinkable laminate film was obtained in the same manner as in Example B-1 except that as shown in Table 3, in Example B-1, AD1 used for the adhesive layer (AD layer) was changed to a styrene/isoprene copolymer (HYBRAR 5125, manufactured by KURARAY CO., LTD., styrene content: 20 mass %, Tg: −8° C., hereinafter referred to simply as "AD2"). The obtained film was evaluated, and the results are shown in Table 4.

Comparative Example B-1

A heat-shrinkable laminate film was obtained in the same manner as in Example B-1 except that as shown in Table 3, in Example B-1, no adhesive layer (AD layer) was provided, and the thicknesses of the respective layers in the non-stretched laminate sheet were changed to surface layer (S layer)/intermediate layer (M layer)/surface layer (S layer)=45 μm/160 μm/45 μm. The obtained film was evaluated, and the results are shown in Table 4.

Comparative Example B-2

A heat-shrinkable laminate film was obtained in the same manner as in Example B-1 except that as shown in Table 1, in Example B-1, AD1 used for the adhesive layer (AD layer) was changed to an ethylene-acrylic acid copolymer (EAA) (Novatec AT210K, manufactured by Nippon Polyethy K.K., acrylic acid content: 7 mass %, hereinafter referred to simply as "AD3"). The obtained film was evaluated, and the results are shown in Table 4.

Comparative Example B-3

A heat-shrinkable laminate film was obtained in the same manner as in Example B-1 except that as shown in Table 3, in Example B-1, AD1 used for the adhesive layer (AD layer) was changed to SBS (styrene content: 87 mass %, Tg: 36° C., hereinafter referred to simply as "AD4"). The obtained film was evaluated, and the results are shown in Table 4.

Comparative Example B-4

A heat-shrinkable laminate film was obtained in the same manner as in Example B-1 except that as shown in Table 1, in Example B-1, the mass ratio of the mixed resin composition comprising SBS1 and SBS2 used for the intermediate layer (M layer) was changed to 20 mass % of SBS1 and 80 mass % of SBS2. The obtained film was evaluated, and the results are shown in Table 4.

TABLE 3

|  |  | Examples | | | Comparative Examples | | | |
|---|---|---|---|---|---|---|---|---|
|  |  | B-1 | B-2 | B-3 | B-1 | B-2 | B-3 | B-4 |
| S layer (mass %) | PETG | 100 | 100 | 100 | 100 | 100 | 100 | 100 |
| AD layer (mass %) | AD1 | 100 | 100 |  | — |  |  | 100 |
|  | AD2 |  |  | 100 |  |  |  |  |
|  | AD3 |  |  |  |  | 100 |  |  |
|  | AD4 |  |  |  |  |  | 100 |  |
| M layer (mass %) | SBS1 | 45 | 35 | 45 | 45 | 45 | 45 | 20 |
|  | SBS2 | 55 | 65 | 55 | 55 | 55 | 55 | 80 |

TABLE 4

|  |  | Examples | | | Comparative Examples | | | |
|---|---|---|---|---|---|---|---|---|
|  |  | B-1 | B-2 | B-3 | B-1 | B-2 | B-3 | B-4 |
| Tensile modulus of elasticity (MPa) |  | 1,421 | 1,240 | 1,438 | 1,513 | 1,373 | 1,530 | 1,069 |
|  |  | ⊚ | ○ | ⊚ | ⊚ | ○ | ⊚ | X |
| Tensile modulus of M layer (MPa) |  | 1,408 | 1,088 | 1,408 | 1,408 | 1,408 | 1,408 | 769 |
| Heat shrinkage (%) | 70° C. | 20.0 | 22.1 | 19.3 | 18.8 | 19.9 | 19.3 | 24.3 |
|  | 80° C. | 50.2 | 49.5 | 52.2 | 53.5 | 49.5 | 49.0 | 46.6 |
|  | 90° C. | 67.3 | 65.4 | 68.7 | 70.2 | 66.3 | 67.0 | 62.7 |
| Tg of AD layer (° C.) |  | −56 | −56 | −8 | — | 7 | 37 | −8 |

TABLE 4-continued

|  | Examples | | | Comparative Examples | | | |
| --- | --- | --- | --- | --- | --- | --- | --- |
|  | B-1 | B-2 | B-3 | B-1 | B-2 | B-3 | B-4 |
| Natural shrinkage (%) | 0.9 | 1.2 | 0.8 | 0.9 | 1.0 | 0.9 | 0.8 |
| Haze (%) | 3.6 | 3.7 | 3.6 | 3.1 | 3.4 | 3.4 | 3.5 |
| Tensile Elongation at Break (%) | 333 | 325 | 293 | 287 | 312 | 312 | 358 |
| Low temperature Tensile Elongation at Break (%) | 224 | 276 | 201 | 208 | 211 | 211 | 332 |
| Seal strength (N/15 mm width) | ⊚ | ⊚ | ⊚ | X | ○ | X | ⊚ |
| Shrink finishing quality | ⊚ | ⊚ | ⊚ | ⊚ | ⊚ | ⊚ | ○ |
| Haze after returned (%) | 4.8 | 4.6 | 6.2 | 3.5 | 12.4 | 3.8 | 4.3 |
|  | ⊚ | ⊚ | ⊚ | ⊚ | X | ⊚ | ⊚ |
| Overall evaluation | ⊚ | ○ | ⊚ | X | X | X | X |

From Tables 3 and 4, it is evident that with the films of Examples B-1, B-2 and B-3 constituted by the layers within the scope defined by the present invention, the elasticity (the tensile modulus of elasticity of the laminated films and the intermediate layer (M layer)), the interlaminar peel strength and the transparency when returned, were superior to Comparative Example B-1, and the shrink finishing quality was also equal to Comparative Example B-1.

Whereas, in the case where no adhesive layer was present (Comparative Example B-1), no adequate interlaminar peel strength was obtained, and delamination occurred during the test. Further, in the case where ethylene-acrylic acid copolymer was used as the resin to constitute the adhesive layer (AD layer) (Comparative Example B-2), the haze value after recycled tended to deteriorate. Further, in the case where the styrene content in the styrene resin to constitute the adhesive layer (AD layer) exceeded 40 mass % (Comparative Example B-3), the seal strength tended to deteriorate. On the other hand, in the case where the styrene content in the styrene resin to constitute the intermediate layer (M layer) was low (Comparative Example B-4), the tensile modulus of elasticity of the entire laminate film and the intermediate layer (M layer) tended to deteriorate, and the elasticity tended to deteriorate.

It is thereby evident that the films of the present invention are heat-shrinkable laminate films which are excellent in the transparency when incorporated as recycled, the shrink finishing quality and the natural shrinkage and have delamination of films suppressed and which are thus suitable for applications to shrink packaging, shrink bundling packaging or heat-shrinkable labels.

INDUSTRIAL APPLICABILITY

The film of the present invention is a heat-shrinkable laminate film which is excellent in the elasticity (rigidity at room temperature), the shrink finishing quality, the transparency when incorporated as recycled and the natural shrinkage and has delamination of the film suppressed and which is thus suitable for applications to shrink packaging, shrink bundling packaging, shrink labels, etc. Therefore, it may be used as various molded products such as bottles (blow bottles), trays, lunch boxes, prepared food containers and milk product containers. Especially, it can be returned to the intermediate layer (M layer) in the production process, and it is thus very advantageous also from the viewpoint of costs.

The invention claimed is:

1. A heat-shrinkable laminate film comprising:
a surface layer comprising a polyester resin;
an adhesive layer comprising an adhesive resin; and
an intermediate layer comprising a styrene resin wherein the styrene resin contains as a main component, a mixture of at least two different copolymers of a styrene hydrocarbon with butadiene differing in styrene content; and one of the at least two different copolymers has a styrene content of 80 to 95 mass % and at least one of the other different copolymers has a styrene content of 60 to 80 mass %;
wherein the adhesive layer is adjacently positioned between the surface layer and the intermediate layer; and
wherein a heat shrinkage of the film in the main shrink direction is at least 10% and less than 30% when the film is dipped in water of 70° C. for 10 seconds, and at least 30% and at most 70% when the film is dipped in water of 80° C. for 10 seconds
wherein the intermediate layer includes the heat-shrinkable laminate film as recycled, in an amount of at most 40 mass % based on the total amount of the film, and the haze value of the film is at most 10% as measured in accordance with JIS K7105, and
wherein the heat-shrinkable laminate film has a five-layer structure, in order, of: a surface layer, an adhesive layer, an intermediate layer, an adhesive layer, a surface layer.

2. The heat-shrinkable laminate film according to claim 1, wherein the adhesive resin included in the adhesive layer is a mixture of resins included in the surface layer and the intermediate layer.

3. The heat-shrinkable laminate film according to claim 1, wherein the adhesive resin included in the adhesive layer is either one resin or a mixture of at least two resins selected from the group consisting of a soft styrene resin, a modified styrene resin, a resin having polar groups reactive with a polyester resin and being compatible with a styrene resin, and a resin having a high affinity with a polyester resin and being compatible with a styrene resin.

4. The heat-shrinkable laminate film according to claim 1, wherein the styrene resin included in the intermediate layer is either a styrene-butadiene block copolymer, a styrene-isoprene-butadiene block copolymer, or a mixture of the styrene-butadiene block copolymer and the styrene-isoprene-butadiene block copolymer.

5. The heat-shrinkable laminate film according to claim 1, wherein:
the polyester resin included in the surface layer comprises dicarboxylic acid residues and diol residues;
at least either the dicarboxylic acid residues or the diol residues include at least two residues; and
among said at least two residues, the total content of residues other than the most abundant residue is at least 10 mol % and at most 40 mol %, based on the sum, which is 200 mol %, of the total amount of 100 mol % of the dicarboxylic acid residues and the total amount of 100 mol % of the diol residues.

6. The heat-shrinkable laminate film according to claim 1, wherein:
the adhesive layer comprising a resin including either a copolymer of a styrene hydrocarbon with a conjugated diene, or a hydrogenated derivative of the copolymer, a styrene content in either the copolymer or the hydrogenated derivative being at least 5 mass % and at most 40 mass %;
wherein a tensile modulus of elasticity of the film in a direction perpendicular to a main shrink direction is at least 1,200 MPa.

7. The heat-shrinkable laminate film according to claim 1, wherein the polyester resin included in the surface layer is a resin including at least one polyester resin comprising polybasic carboxylic acid residues and polyhydric alcohol residues.

8. The heat-shrinkable laminate film according to claim 1, wherein the polyester resin included in the surface layer is a resin including a non-crystalline polyethylene terephthalate resin comprising aromatic dicarboxylic acid residues and diol residues, wherein 1,4-cyclohexane dimethanol residues in all diol residues are at least 15 mol % and at most 50 mol %.

9. The heat-shrinkable laminate film according to claim 1, wherein the film has a seal strength of at least 3N/15 mm width and at most 20N/15 mm width when the film is delaminated at a tensile rate of 200 mm/min in an environment of 23° C. under 50% RH.

10. A molded product employing the heat-shrinkable laminate film as defined in claim 1 as the base material.

11. A heat-shrinkable label employing the heat-shrinkable laminate film as defined in claim 1 as the base material.

12. A container provided with the molded product as defined in claim 10.

13. A container provided with the heat-shrinkable label as defined in claim 11.

14. The heat-shrinkable laminate film according to claim 1, wherein the heat-shrinkable laminate film is produced by laminating the layers and then stretching the laminate.

15. The heat-shrinkable laminate film according to claim 1, wherein the haze value after the return is incorporated is at most 7.0% as measured in accordance with JIS K7105.

16. A heat-shrinkable laminate film comprising:
a surface layer comprising a polyester resin;
an adhesive layer comprising an adhesive resin; and
an intermediate layer comprising a styrene resin selected from the group consisting of a copolymer of a styrene hydrocarbon with a conjugated diene, a mixture of at least two different copolymers of a styrene hydrocarbon with a conjugated diene differing in styrene content, a copolymer of said styrene hydrocarbon-conjugated diene copolymer with a monomer copolymerizable with a styrene hydrocarbon or conjugated diene, and combinations thereof;
wherein the adhesive layer is adjacently positioned between the surface layer and the intermediate layer; and
wherein a heat shrinkage of the film in the main shrink direction is at least 10% and less than 30% when the film is dipped in water of 70° C. for 10 seconds, and at least 30% and at most 70% when the film is dipped in water of 80° C. for 10 seconds
wherein the intermediate layer includes the heat-shrinkable laminate film as recycled, in an amount of at most 40 mass % based on the total amount of the film, and the haze value of the film is at most 7% as measured in accordance with JIS K7105, and
wherein the heat-shrinkable laminate film has a five-layer structure, in order, of: a surface layer, an adhesive layer, an intermediate layer, an adhesive layer, a surface layer.

17. The heat-shrinkable laminate film according to claim 16, wherein the adhesive resin included in the adhesive layer is a mixture of resins included in the surface layer and the intermediate layer.

18. The heat-shrinkable laminate film according to claim 16, wherein the adhesive resin included in the adhesive layer is either one resin or a mixture of at least two resins selected from the group consisting of a soft styrene resin, a modified styrene resin, a resin having polar groups reactive with a polyester resin and being compatible with a styrene resin, and a resin having a high affinity with a polyester resin and being compatible with a styrene resin.

19. The heat-shrinkable laminate film according to claim 16, wherein the styrene resin included in the intermediate layer is either a styrene-butadiene block copolymer, a styrene-isoprene-butadiene block copolymer, or a mixture of the styrene-butadiene block copolymer and the styrene-isoprene-butadiene block copolymer.

20. The heat-shrinkable laminate film according to claim 16, wherein:
the polyester resin included in the surface layer comprises dicarboxylic acid residues and diol residues;
at least either the dicarboxylic acid residues or the diol residues include at least two residues; and
among said at least two residues, the total content of residues other than the most abundant residue is at least 10 mol % and at most 40 mol %, based on the sum, which is 200 mol %, of the total amount of 100 mol % of the dicarboxylic acid residues and the total amount of 100 mol % of the diol residues.

21. The heat-shrinkable laminate film according to claim 16, wherein:
the adhesive layer comprising a resin including either a copolymer of a styrene hydrocarbon with a conjugated diene, or a hydrogenated derivative of the copolymer, a styrene content in either the copolymer or the hydrogenated derivative being at least 5 mass % and at most 40 mass %; and
wherein a tensile modulus of elasticity of the film in a direction perpendicular to a main shrink direction is at least 1,200 MPa.

22. The heat-shrinkable laminate film according to claim 16, wherein the polyester resin included in the surface layer is a resin including at least one polyester resin comprising polybasic carboxylic acid residues and polyhydric alcohol residues.

23. The heat-shrinkable laminate film according to claim 16, wherein the polyester resin included in the surface layer is a resin including a non-crystalline polyethylene terephthalate resin comprising aromatic dicarboxylic acid residues and diol residues, wherein 1,4-cyclohexane dimethanol residues in all diol residues are at least 15 mol % and at most 50 mol %.

24. The heat-shrinkable laminate film according to claim 16, wherein the film has a seal strength of at least 3N/15 mm width and at most 20N/15 mm width when the film is delaminated at a tensile rate of 200 mm/min in an environment of 23° C. under 50% RH.

25. A molded product employing the heat-shrinkable laminate film as defined in claimed 16 as the base material.

26. A heat-shrinkable label employing the heat-shrinkable laminate film as defined in claim 16 as the base material.

27. A container provided with the molded product as defined in claim 25.

28. A container provided with the heat-shrinkable label as defined in claim 26.

29. The heat-shrinkable laminate film according to claim 16, wherein the heat-shrinkable laminate film is produced by laminating the layers and then stretching the laminate.

30. The heat-shrinkable laminate film according to claim 16, wherein the intermediate layer comprises a styrene resin, wherein the styrene resin contains as a main component, a mixture of at least two different copolymers of a styrene hydrocarbon with butadiene differing in styrene content; and one of the at least two different copolymers has a styrene content of 80 to 95 mass % and at least one of the other different copolymers has a styrene content of 60 to 80 mass %.

* * * * *